(12) United States Patent
Verma et al.

(10) Patent No.: US 10,531,318 B1
(45) Date of Patent: Jan. 7, 2020

(54) MOBILE DATA SCHEDULING BASED ON SIGNAL STRENGTH AND USER AVAILABILITY

(71) Applicant: International Business Machines Corporation, Armonk, NY (US)

(72) Inventors: Pramod Verma, Fairfax, VA (US); Rachel Leekin, White Plains, NY (US); Seema Nagar, Bangalore (IN); Kuntal Dey, New Delhi (IN)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 16/202,421

(22) Filed: Nov. 28, 2018

(51) Int. Cl.
   *H04W 24/02* (2009.01)
   *H04W 4/16* (2009.01)
   *H04L 12/24* (2006.01)
   *H04B 17/318* (2015.01)

(52) U.S. Cl.
   CPC .......... *H04W 24/02* (2013.01); *H04B 17/318* (2015.01); *H04L 41/147* (2013.01); *H04W 4/16* (2013.01)

(58) Field of Classification Search
   CPC ...... H04W 24/02; H04W 4/16; H04B 17/318; H04L 41/147
   USPC ......................................................... 455/445
   See application file for complete search history.

(56) References Cited

U.S. PATENT DOCUMENTS

| | | | |
|---|---|---|---|
| 9,319,521 B1 * | 4/2016 | Chan | H04M 1/64 |
| 9,338,747 B1 * | 5/2016 | Parthasarathy | H04W 52/0245 |
| 9,693,200 B2 * | 6/2017 | Dunkin | H04L 67/2847 |
| 2013/0060587 A1 * | 3/2013 | Bayrak | G06Q 10/10 705/7.11 |
| 2015/0168164 A1 * | 6/2015 | Patil | G01C 21/34 455/421 |
| 2015/0358834 A1 | 12/2015 | Cronin | |
| 2016/0112941 A1 * | 4/2016 | Desai | H04L 12/145 370/329 |
| 2016/0227028 A1 | 8/2016 | Chan et al. | |
| 2017/0171325 A1 * | 6/2017 | Perez | H04L 67/22 |
| 2018/0023968 A1 * | 1/2018 | Stuchfield | G01C 21/3453 701/416 |
| 2018/0152530 A1 | 5/2018 | Zuo et al. | |
| 2018/0262539 A1 * | 9/2018 | Feast | H04L 65/1069 |
| 2019/0036630 A1 * | 1/2019 | Svennebring | H04B 17/373 |

OTHER PUBLICATIONS

Disclosed Anonymously et al., "System and Method to Dynamically Update the Caller on the Availability of the Callee Before Connecting the Call", An IP.com Prior Art Database Technical Disclosure, IP.com No. IPCOM000240942D, IP.com Electronic Publication Date: Mar. 15, 2015, 5 pages.

* cited by examiner

*Primary Examiner* — Mong-Thuy T Tran
(74) *Attorney, Agent, or Firm* — Randy E. Tejeda (57) ABSTRACT

In an approach to determining and scheduling future data transfers, one or more computer processors determine one or more future data transfers. The one or more computer processors identify an intended travel path of a user over a time interval. The one or more computer processors predict a network signal strength of a user device for the intended travel path over the time interval. The one or more computer processors schedule the one or more future data transfers during the time interval based on the predicted network signal strength.

20 Claims, 4 Drawing Sheets

MOBILE DATA SCHEDULING BASED ON SIGNAL STRENGTH AND USER AVAILABILITY

BACKGROUND

The present invention relates generally to the field of communication and more particularly to mobile data scheduling.

Decibel-millwats (dBm or dBmW) is unit of measurement used to indicate that a power ratio is expressed in decibels (dB) with reference to one milliwatt (mW). It is used in radio, microwave, and fiber-optical communication networks as a convenient measure of absolute power because of its capability to express both very large and very small values in a short form compared to dBW, which is referenced to one watt (1,000 mW).

A Gaussian process is a stochastic process (a collection of random variables indexed by time or space), such that every finite collection of those random variables has a multivariate normal distribution. The distribution of a Gaussian process is the joint distribution of random variables, and as such, it is a distribution over functions with a continuous domain, e.g. time or space. Gaussian processes are useful in statistical modelling, benefiting from properties inherited from the normal distribution. For example, if a random process is modelled as a Gaussian process, the distributions of various derived quantities can be obtained explicitly.

Navigational systems (map application) consist of a geographic information system (GIS) database and a global positioning system (GPS). GIS describes any information system that integrates, stores, edits, analyzes, shares, and displays geographic information. GPS navigation software usually falls into one of the following two categories: navigation with route calculation and directions from the software to the user of the route to take. Often navigational systems are based on a vector-based map and include navigation tracking, often with a map "picture" in the background, showing where the user has been, and giving a line the user can follow on a screen.

SUMMARY

Embodiments of the present invention disclose a method for determining and scheduling telephone recipients. The method includes one or more computer processors determining one or more future telephone calls to one or more possible recipients. The one or more computer processors identify an intended travel path of a user over a time interval. The one or more computer processors predict a cellular signal strength of a user device for the intended travel path over the time interval. The one or more computer processors schedule the one or more future telephone calls to the one or more possible recipients during the time interval based on the predicted cellular signal strength.

Another embodiment of the present invention discloses a method and a system for determining and scheduling future data transfers. The method includes one or more computer processors determining one or more future data transfers. The one or more computer processors identify an intended travel path of a user over a time interval. The one or more computer processors predict a network signal strength of a user device for the intended travel path over the time interval. The one or more computer processors schedule the one or more future data transfers during the time interval based on the predicted network signal strength.

DETAILED DESCRIPTION

When traveling, users may encounter segments, areas or regions that have little to no cellular coverage. Moreover, regions with historically strong cellular strength may experience significant issues when user and traffic density increase, for example in rush hour traffic. As more cellular users enter an area and initiate/receive cellular calls in these areas, cellular bandwidth can be saturated. The aforementioned issue cannot be remedied by adding more cell towers due to bandwidth scarcity rather than a lack of cellular coverage. In these poor cellular areas, data connections (i.e., video streaming, phone calls, web browsing, etc.) may initiate but disconnect or drop later in the conversation or may refuse to connect.

Embodiments of the present invention recognize that traveling users encounter numerous issues concerning continuous cellular coverage and strength. Typically, users, while traveling, make or take phone calls on a first-come-first-serve basis irrespective of any impending issues with cellular strength. While the call might initiate without issues, it does not guarantee that the cellular strength will be sufficient to sustain the entirety of the conversation. Furthermore, the user, typically, lacks the ability to aggregate historical conversation metadata and estimate, accurately, the duration of the call. Embodiments of the present invention recognize that cellular based conversations are improved by scheduling calls based on current and anticipated cellular coverage, strength, and estimated call duration. Effectively optimizing and scheduling calls improve the cellular experience for the caller and the recipient and reduces the amount of bandwidth and resources needed to complete these calls. Embodiments of the present invention further recognize that scheduling and optimizing mobile data significantly increases available mobile bandwidth, especially in high density/traffic areas. Implementation of embodiments of the invention may takes a variety of forms, and exemplary implementation details are discussed subsequently with reference to the Figures.

Figure 1:
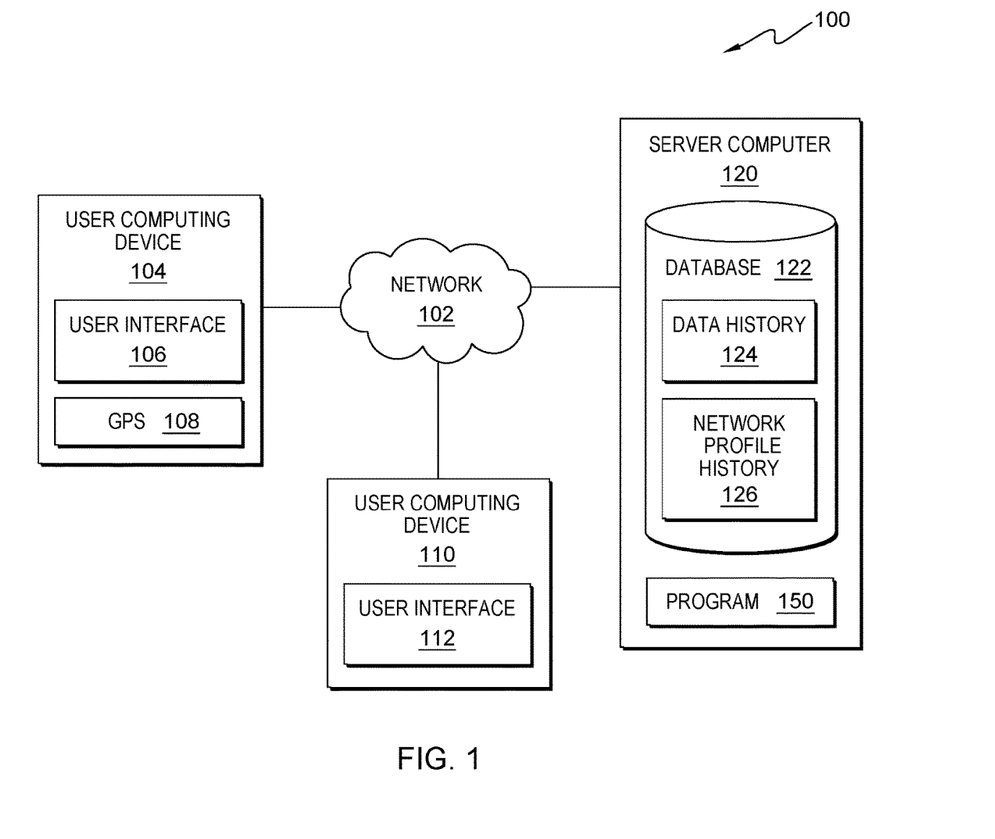
FIG. 1 is a functional block diagram illustrating a distributed data processing environment, in accordance with an embodiment of the present invention.

The present invention will now be described in detail with reference to the Figures. FIG. 1 is a functional block diagram illustrating a distributed data processing environment, generally designated 100, in accordance with one embodiment of the present invention. The term "distributed" as used in this specification describes a computer system that includes multiple, physically, distinct devices that operate together as a single computer system. FIG. 1 provides only an illustration of one embodiment and does not imply any limitations with regard to the environments in which different embodiments may be implemented. Many modifications to the depicted environment may be made by those skilled in the art without departing from the scope of the invention as recited by the claims.

In the depicted embodiment, distributed data processing environment 100 includes user computing device 104, user computing device 110, and server computer 120, interconnected over network 102. Network 102 can be, for example, a telecommunications network, a local area network (LAN), a wide area network (WAN), such as the Internet, or a combination of the three, and can include wired, wireless, or fiber optic connections. Network 102 can include one or more wired and/or wireless networks that are capable of receiving and transmitting data, voice, and/or video signals, including multimedia signals that include voice, data, and video information. In general, network 102 can be any combination of connections and protocols that will support communications between user computing device 104, user computing device 110, server computer 120, and other computing devices (not shown) within distributed data processing environment 100.

User computing device 104 and user computing device 110 may each be a web server or any other electronic device or computing system capable of processing program instructions and receiving and sending data. In some embodiments, user computing device 104 and user computing device 110 may each be a laptop computer, a tablet computer, a netbook computer, a personal computer (PC), a desktop computer, a personal digital assistant (PDA), a smart phone, or any programmable electronic device capable of communicating with network 102. In other embodiments, user computing device 104 and user computing device 110 may each represent a server computing system utilizing multiple computers as a server system, such as in a cloud computing environment. In the depicted embodiment, user computing device 104 and user computing device 110 are smart phones or any programmable electronic device capable of telecommunication. In general, user computing device 104 and user computing device 110 are representative of any electronic device or combination of electronic devices capable of executing machine readable program instructions as described in greater detail with regard to FIG. 4, in accordance with embodiments of the present invention. User computing device 104 and user computing device 110 contain user interface 106 and user interface 112, respectively. In the depicted embodiment, user computing device 104 also contains GPS 108. In some embodiments, user computing device 104 and user computing device 110 may each include one or more of a plurality of location detection techniques.

User interface 106 and user interface 112 are programs that provide an interface between a user of user computing device 104, user computing device 110, and a plurality of applications that may reside on user computing device 104 and user computing device 110 (e.g., telecommunication application (not depicted)) and/or may be accessed over network 102. A user interface, such as user interface 106 and user interface 112, refers to the information (e.g., graphic, text, sound) that a program presents to a user and the control sequences the user employs to control the program. A variety of types of user interfaces exist. In one embodiment, user interface 106 and user interface 112 are graphical user interfaces. A graphical user interface (GUI) is a type of interface that allows users to interact with peripheral devices (i.e., external computer hardware that provides input and output for a computing device, such as a keyboard and mouse) through graphical icons and visual indicators as opposed to text-based interfaces, typed command labels, or text navigation. The actions in GUIs are often performed through direct manipulation of the graphical elements. User interface 106 and user interface 112 each send and receive information through network 102 to program 150.

GPS 108 is a device, receiver, or sensor that is capable of receiving information from GPS satellites and calculating the geographical position of the device. In most embodiments, GPS 108 has a track algorithm that combines sets of satellite measurements collected at different times. After a set of measurements are processed, the track algorithm predicts the receiver location corresponding to the next set of satellite measurements. When the new measurements are collected, the receiver uses a weighting scheme to combine the new measurements with the tracker prediction. In general, a tracker can (a) improve receiver position and time accuracy, (b) reject bad measurements, and (c) estimate receiver speed and direction. GPS 108 also transmits information regarding the orientation and speed of the user.

Server computer 120 can be a standalone computing device, a management server, a web server, a mobile computing device, or any other electronic device or computing system capable of receiving, sending, and processing data. In other embodiments, server computer 120 can represent a server computing system utilizing multiple computers as a server system, such as in a cloud computing environment. In another embodiment, server computer 120 can be a laptop computer, a tablet computer, a netbook computer, a personal computer (PC), a desktop computer, a personal digital assistant (PDA), a smart phone, or any programmable electronic device capable of communicating with user computing device 104, user computing device 110, and other computing devices (not shown) within distributed data processing environment 100 via network 102. In another embodiment, server computer 120 represents a computing system utilizing clustered computers and components (e.g., database server computers, application server computers, etc.) that act as a single pool of seamless resources when accessed within distributed data processing environment 100. In the depicted embodiment, server computer 120 includes database 122 and program 150. In other embodiments, server computer 120 may contain other applications, databases, programs, etc. which have not been depicted in distributed data processing environment 100. Server computer 120 may include internal and external hardware components, as depicted and described in further detail with respect to FIG. 4.

Database 122 is a repository for data used by GPS 108 and program 150. In the depicted embodiment, database 122 resides on server computer 120. In another embodiment, database 122 may reside on user computing device 104, user computing device 110, or elsewhere within distributed data processing environment 100 provided program 150 has access to database 122. A database is an organized collection of data. Database 122 can be implemented with any type of storage device capable of storing data and configuration files that can be accessed and utilized by program 150, such as a database server, a hard disk drive, or a flash memory. In an embodiment, database 122 stores data used by program 150, such as metadata associated with a location within a map application (not depicted), and metadata associated with a location of a user (e.g., signal strength data, traffic data, average speed). In embodiment, database 122 maintains a dynamic list of call recipients including current and future call recipients. In another embodiment, database 122 may be a geographic information system (GIS) database. In other embodiments, database 122 may also store user responses to previously placed communications. For example, a user, after experiencing several dropped calls within a particular segment of a trip, logs a negative response that is associated with the segment. In the depicted embodiment, database 122 includes data history 124 and network profile history 126.

Data history 124 contains data information based from historical data transfers (upload or download) such as video streaming, video chatting, mobile conversations, etc. In an embodiment, contains call information based from historical user-recipient conversations. In another embodiment, data information comprises a plurality of metadata including, but is not limited to, the identity of the parties involved (e.g., recipients), data transfer durations, cellular strength (average dBm, call drops, reductions in call quality), method of communication, communication device type, etc. In this embodiment, data information encompasses call information which contains more metadata regarding mobile phone calls as a subset of data information. In yet another embodiment, data history 124 includes the mean data transfers or call duration and the associated duration variance (standard deviation) for each recipient. For example, the user communicates with an example recipient on average for 12 minutes with a variance of 3 minutes. In this example, there is a 95% (within one standard deviation) chance that a call would last between 9 minutes and 15 minutes. In yet another embodiment, call information includes a probability distribution (e.g., mu-sigma Gaussian curve) for each recipient that extrapolates average data transfers and/or call durations as a continuous distribution with maximum entropy for a specified mean and variance. In an embodiment, the user can input recorded calls, data transfer/usage information, and associated metadata into data history 124. In another embodiment, data history 124 retrieves data/call information from a plurality of known communication systems such as a dialer application (not depicted) or from historical data/call records from a cellular provider. In yet another embodiment, data history 124 monitors instances of user computing device 104 and user computing device 110 for data, calls, and associated data/call information.

Network profile history 126 contains historical network (e.g., wireless, satellite, cellular, cable, internet, telecom, near-field communications, radio waves, etc.) information. In an embodiment, network information includes, but is not limited to, average dBm, locations of cellular towers, coverage radii of cellular towers, etc. In another embodiment, network profile history 126 associates a GIS database located within database 122 with said network information. In this embodiment, network profile history 126 provides network information (e.g., signal strength, etc.) for any given location, route, or segment. In another embodiment, network profile history 126 contains network signal strength sampling information (e.g., signal strength, user location, etc.) obtained from other users. For example, as other users travel with instances of user computing device 104 and user computing device 110, samples of local network signal strength and location information (GPS coordinates, etc.) are recorded and transmitted. In an embodiment, network signal strength samples are associated with GPS coordinates and/or with a GIS to create virtualized maps of network coverage/strength. In another embodiment, network strength samples are associated with the GPS coordinates of a specific location and network strength samples from local cellular towers. For example, a specific location has associated network strength samples from all reachable cellular towers. In this example, a general composite network signal strength (e.g., cellular signal strength) is extrapolated from the aggregation of all the cellular towers in a specific location.

In various embodiments, program 150 prompts the user to authorize program 150 to collect data (i.e., emails, location metadata, data usage history, telephone call logs, etc.) and log said data into database 122, including data history 124, and network profile history 126. In another embodiment, program 150 may access a plurality of cameras and microphones (not depicted) that are registered (i.e., user opted-in to providing information and access to program 150) by the user. In an example, the user permits program 150 to access and utilize a video feed, images, and audio from a camera. In an embodiment, the user may opt-in/opt-out for any monitored and/or logged data. In a further embodiment, the user can remove any non-public data at any moment from database 122. For example, the user opts to removes all telephone call logs from database 122 and prevents program 150 from retrieving additional telephone call logs.

In various embodiments, the term "recipient" should be construed having a broad meaning and include all types and categories of entities. In another embodiment, the term "recipient" may be construed to include a single entity, or a multitude of entities contained in a conversation or mobile call. For example, in a group call, the term recipient is construed to include the group of entities. In other embodiments, the term "recipient" may be construed to include any entity capable of sending and/or receiving data or providing a medium to sending/receive data (network provider). For example, if the user wishes to stream or download a movie, the streaming service provider is construed as a "recipient". In various embodiments, telephone calls, video, and audio chats/conferences are construed as an abstraction of general data usage.

Program 150 leverages historical data usage and network profiles, to schedule user data usage along a predicted user travel path. In the depicted embodiment, program 150 is a standalone software program. In another embodiment, the functionality of program 150, or any combination programs thereof, may be integrated into a single software program. In some embodiments, program 150 may be located on separate computing devices (not depicted) but can still communicate over network 102. In some embodiments, program 150 may implement the following steps. Program 150 determines potential recipients by analyzing historical usage, user inputs, and/or user schedules/appointments. Program 150 identifies the user travel path by utilizing calculated travel paths inputted by the user or generated by a navigational system (not depicted). Program 150 utilizes historical network profiles to identify what portions of the user travel path have sufficient network signal strength for reliable data usage. Program 150 generates a schedule of recipients based on the identified network profiles and the user travel duration. Program 150 notifies the recipients and user of the schedule. Program 150 is depicted and described in further detail with respect to FIG. 2.

Figure 2:
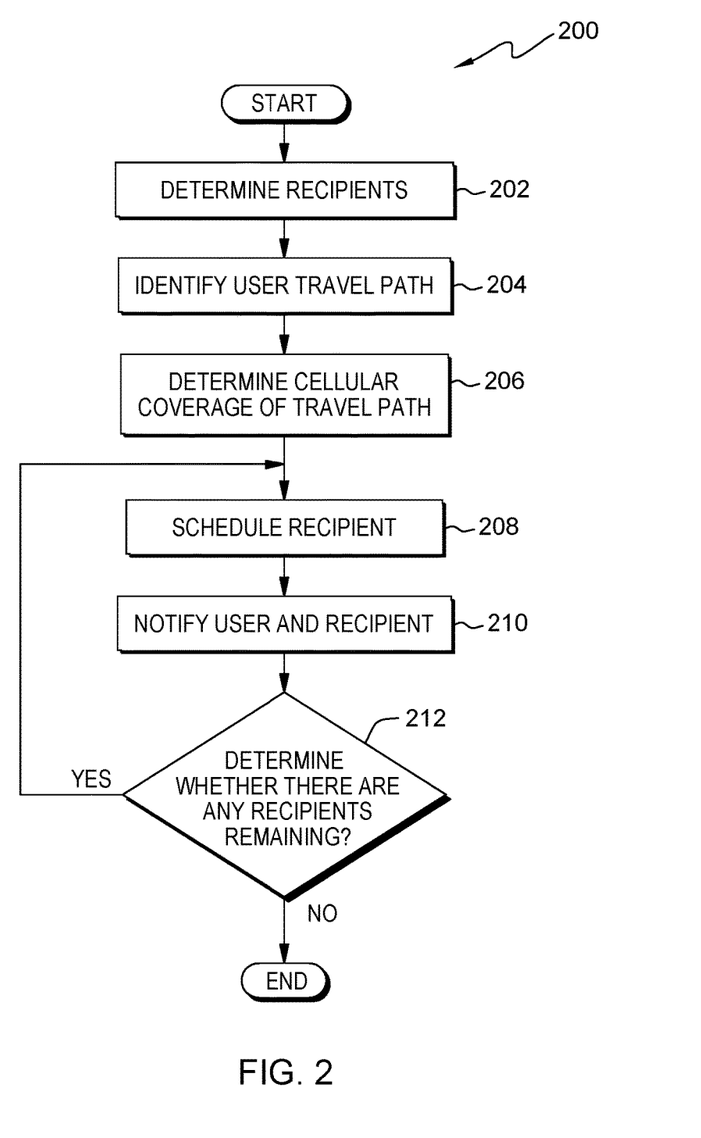
FIG. 2 is a flowchart depicting operational steps of a program, on a server computer within the distributed data processing environment of FIG. 1, for determining and scheduling data recipients, in accordance with an embodiment of the present invention.

FIG. 2 is a flowchart depicting operational steps of program 150, on server computer 120 within distributed data processing environment 100 of FIG. 1, for determining and scheduling data recipients, in accordance with an embodiment of the present invention.

Program 150 determines recipients (step 202). In an embodiment, program 150 determines recipients when the user commences a scheduled trip. In another embodiment, program 150 receives a prompt from the user to begin determining recipients. For example, as the user begins a trip, the user signals program 150 to begin determining recipients. In various embodiments, the user inputs the start and end times of a trip. In yet another embodiment, program 150 initiates at extrapolated times based on recurring non-scheduled events. For example, the user leaves work every day at 5 pm and travels 30 minutes to a spin class. In this example, program 150 recognizes the unscheduled recurring 30-minute travel segment and determines recipients to fill in that segment. In a further embodiment, program 150 receives a notification that the user has entered a vehicle.

In other embodiments, program 150 retrieves and utilizes the general data history of the user to extrapolate recurring data transfers, recurring recipients, recurring travel locations, and associated durations. For example, if the user calls a specific person every day at 6 pm, then program 150 determines that specific person as a recipient and associates a 6 pm call with that recipient. In another example, the user video chats a specific person every night on the way home, here, program 150 determines said person as a recipient and associates the time and the method of communication (e.g., video chat) with said recipient. In a further embodiment, program 150 retrieves the general data history of the user from data history 124, from a network provider, or from a data/call log located within user computing device 104. In various embodiments, the data history includes call logs that contain recipients, call times, and durations. In an embodiment, program 150 utilizes machine learning, specifically data mining techniques (i.e., clustering, regression, association rule learning, anomaly detection, classification, etc.) to identify recurring patterns within the data history along with a plurality of datasets such as historical trips, historical destinations (locations), historical data transfer metadata (i.e., duration, speed, content, provider, etc.), historical telephone logs, historical recipients, etc. In a further embodiment, program 150 utilizes connectivity-based clustering to extrapolate patterns within the aforementioned datasets and information. In an example, program 150 determines that the user, while commuting to work, streams a popular television show every week, by clustering the historical trips of the user with data transfers that occurred during the same period.

In an embodiment, program 150 prompts the user for authorization to monitor the communications (emails, telephone calls, video chats, SMSs, etc.) of the user. In this embodiment, program 150 utilizes the communications of the user to identify recipients, scheduled data transfers, scheduled events, or scheduled travel locations and associated travel information (dates, method of transportation, etc.). In further embodiment, program 150 utilizes natural language processing (NLP) techniques (i.e., sentence splitting, tokenization, POS tagging, chunking, dependency parsing, anaphora resolution, etc.) to parse the emails and identify recipients, scheduled data transfers, scheduled events, etc. For example, the user emails "I will be on the road tomorrow morning" to a coworker. In this example, program 150 determines that the user will be traveling tomorrow morning, automatically initiating when the user commences the trip.

In an embodiment, program 150 predicts future data transfers (e.g., video streaming, audio streaming, cloud-based backups, scheduled downloads and uploads, email synchronization, etc.) based on historical data usage. For example, program 150 identifies that the user frequently watches movies while traveling by plane. In yet another embodiment, program 150 determines future data transfers based on video/audio streaming queues and wish lists. For example, program 150 retrieves content provider generated video queues based on the historical viewing patterns of the user. In another example, the user creates sets of queues that contain movies and television shows that the user may want to watch in the future. In various embodiments, program 150 determines recipients from historical data usage. For example, if a user regularly listens to a podcast on a daily work commute, then program 150 determines the podcast provider as a recipient.

In an embodiment, program 150 receives a list of recipients from a scheduling/calendar application (not depicted) where the user or other users may schedule future calls. For example, the user schedules three calls to take place during an estimated 28-minute car ride. In this example, program 150 receives the list of recipients from the scheduling/calendar application. In another embodiment, the user can predetermine and input recipients through a user interface (e.g., user interface 106 and user interface 112). For example, the user manually inputs three calls to take place during a train ride from New York City to Newark. In yet another embodiment, program 150 monitors user computing device 104 and user computing device 110 for the initiation a call. For example, when a user initiates a call, program 150 determines the recipient. In an embodiment, program 150 monitors user computing device 104 and user computing device 110 for the receipt a call. For example, the user, while on a call, receives two additional calls. In this example, program 150 determines recipients from the current call and the additional missed calls.

In an embodiment, program 150 assigns weights to predicted events (i.e., data transfers, telephone calls, recipients, destinations, etc.). For example, program 150 calculates the weight as a measure of the likelihood that an event will occur, calculated on a scale of 0 to 100 where greater values (e.g., 80) represent a greater likelihood of occurrence and lower numbers (e.g., 20) would indicate a lower likelihood of occurrence. In some embodiments, program 150 assigns a weight each event based on a plurality of factors including, but not limited to: distance from the user to the event, time of the day, traffic conditions, weather conditions, and relevancy to historical events (i.e., data transfers, telephone calls, recipients, destinations, etc.). In various embodiments, program 150 utilizes the weights to rank the predicted events. The ranking functions as a priority score for an event that program 150 determines to be the most likely event. In some embodiments, the ranking serves as a probability score for an event that program 150 determines to be the most probable events that the user may visit.

Program 150 identifies user travel route information (step 204). Travel route information includes, but is not limited to, starting point, destination, method of travel (e.g., walking, car, boat, train, etc.), primary travel path, alternative travel paths and estimated travel time. In an embodiment, program 150 retrieves the travel route information from a navigational system (not depicted). For example, when the user inputs a destination into a navigational system, program 150 retrieves the calculated travel path and expected travel time from said navigational system. In another embodiment, program 150 act as middleware between the user computing device (e.g. user computing device 104) and the navigational system such that the user inputs the destination into program 150 utilizing user interface 106. In this embodiment, program 150 extracts associated travel route information and forwards the information to the navigational system. In an embodiment, program 150 receives a predetermined travel route from user. For example, the user has a preferred route to a specific destination, the user inputs said route, utilizing user interface 106, into program 150.

In another embodiment, program 150 may prompt the user to input the user location. In an embodiment, program 150 utilizes GPS 108 to determine the current location and speed of the user. In other embodiments, program 150 may utilize mobile phone tracking, via triangulation of radio signals between cell towers to determine the location of the user. In some embodiments, program 150 may receive the location via metadata associated with the schedule/calendar of the user. In some embodiments, program 150 may utilize a plurality of factors including, but not limited to, user location, user speed, user travel direction, historical travel paths, visited locations, etc., to predict a user destination. In this embodiment, if the user does not input a destination nor utilizes a navigational system, program 150 utilizes the aforementioned factors to predict a likely destination and generate an estimated travel path.

In an example situation, Marcus goes to a specific bowling alley every day after work and then goes home. In this example, program 150 utilizes user historical travel paths and location in addition to the speed and direction of Marcus to predict the current route, destination, and estimated arrival time. In an embodiment, program 150 utilizes image/object recognition techniques (i.e., edge matching, divide-and-conquer search, greyscale matching, gradient matching, etc.) to confirm the user has arrived at a predicted location. In this embodiment, program 150 utilizes a camera (not depicted) to capture and process images associated with a location such as an image of the storefront, business identifiers (logos, signs, etc.), street signs, building numbers, or address signs. Continuing from the previous example, Marcus, instead of going to the bowling alley, decides to go to a hardware store a few blocks down the road from the bowling alley. In this example, program 150 is not able to differentiate the two locations solely based on the GPS coordinates due to the proximity of the respective locations, instead program 150 utilizes image recognition to determine that the front of the hardware store is not the bowling alley and correctly identifies the hardware store as the user destination.

In an alternative embodiment, if a user deviates from a predicted travel path and/or destination, program 150 may prompt the user for a destination and/or a travel path. Continuing from the previous example situation, Marcus, instead of going to the bowling alley, travels in the opposite direction. In this example situation, program 150 identifies that the current travel path does not correlate to any historical travel path or location, thus program 150 prompts Marcus for a destination and/or travel path.

Program 150 determines the cellular coverage of the travel path (step 206). In an embodiment, program 150 utilizes the current location and expected route of the user to retrieve comparable network (e.g., wireless, satellite, cellular, cable, internet, telecom, near-field communications, radio waves, etc.) information associated with said route. Program 150 may compare the GPS coordinates of the user location and the calculated route with GPS coordinates located in network profile history 126, retrieving associated network information (signal strength, etc.). In another embodiment, program 150 associates the current and predicted location of the user with the associated network information retrieved from network profile history 126. In yet another embodiment, program 150 pairs and matches the travel route of the user with network information from network profile history 126. For example, for a user traveling from New York City to Newark, program 150 utilizes the travel route to determine the associated levels of network signal strengths collected within network profile history 126.

In an embodiment, program 150 divides a calculated travel route into a series of continuous uniform network strength (e.g., strong, average, weak, none, etc.) segments. For example, program 150 divides a calculated trip from New York City to Newark into 5 segments, each with an associated network strength. In this example, segments 1, 2 and 3 have strong network signal strengths, while 4 and 5 have low network signal strengths. In a further embodiment, program 150 retrieves estimated travel times for each segment from a navigational system (not depicted). In an alternative embodiment, program 150 utilizes the speed of the user, along with traffic, road, and weather conditions to estimate the travel time within a particular segment. In a further embodiment, program 150 adjusts the lengths of the segments and corresponding network signal strengths based on the aforementioned factors.

Program 150 schedules a recipient (step 208). Program 150 retrieves the calculated segments from step 206, the determined call recipients, and corresponding call information from data history 124. In an embodiment, program 150 utilizing a plurality of scheduling algorithms, such as First In, First Out (FIFO) or Last In, First Out (LIFO), etc., where program 150 schedules the first determined recipient irrespective of subsequently determined recipients. For example, program 150 schedules the first determined recipient into the first available segment that is capable of sustaining the call throughout the estimated duration. In other embodiments, program 150 utilizes a plurality of optimization algorithms such as Dijkstra's algorithm, minimum spanning trees, etc., where program 150 considers subsequently added recipients to determine the optimal scheduling of all recipients. In this embodiment, program 150 may change or reschedule previously scheduled recipients in order to achieve an optimal schedule. In an embodiment, program 150 utilizes hierarchical categories to prioritize recipients. For example, a scheduled call and/or recipient may have an "important" tag associated, thus program 150 prioritizes this recipient over lower priority recipient. In a further embodiment, program 150 reschedules lower priority calls or recipients when higher priority calls or recipients are determined. In an embodiment, program 150 utilizes hierarchical categories to prioritize data transfers. For example, program 150 prioritizes a device backup over downloading videos or email synchronization.

In another embodiment, program 150 retrieves the schedule/calendar of a recipient. In this embodiment, program 150 may analyze the retrieved schedule/calendar to ensure that the recipient is available for the proposed scheduled call. In various embodiment, program 150 adds the scheduled call to a schedule/calendar of the user. In another embodiment, program 150 may modify the calculated travel route if there is not sufficient network (cellular) strength and/or time to complete a data transfer (call) with every determined recipient. In this embodiment, program 150 may modify the calculated route utilizing a plurality of factors including, but not limited to, relative network (cellular) strength, current and anticipated traffic conditions, time constraints (ability to extend travel time), scheduled data transfers (calls), etc. For example, if there is an alternative route or segment that has substantially greater network strength segments or if the segments better coincide with associated travel times and predicted data transfer (call) durations, then program 150 modifies the user route to take advantage of the alternative path. In various embodiments, program 150 schedules lower priority data transfers, calls, or recipients in travel segments that have relatively worse network signal strength and program 150 schedules higher priority data transfers, calls, or recipients in travel segments that have relatively better network strength.

Program 150 may schedule future data transfers based on the predicted network signal strength of the user travel path. In an embodiment, program 150 identifies future data transfers as discussed in step 202. For example, program 150 predicts that the user will watch two movies, from a content provider, during a scheduled flight. In this example, program 150 predicts what movies the user will watch based on prior data history, a video/audio queue from the content provider and the estimated duration of the flight. In another embodiment, program 150 analyzes the user travel path to determine portions or segments of the user travel path that will not have sufficient network signal strength to complete the data transfer as discussed in step 206. Continuing from the previous example, program 150 identifies several segments of the user travel path that will have extremely poor network signal strength, making it improbable that the user can stream the planned videos. In various embodiments, program 150 automatically initiates a download or an upload prior to a determined poor network signal strength segment or area. In a further embodiment, program 150 automatically pre-downloads or pre-uploads a portion or the entirety of the data transfer based on the determined network signal strengths. Continuing from the previous examples, program 150 determines that no portion of the user travel path will be able to sustain the video stream, thus program 150 downloads both videos to the device of the user allowing the user to view the videos without interruption. In alternative example, program 150 downloads the portion of the video that has a low chance of streaming due to network signal strength. In this example, program 150 only downloads a portion of the video while leaving the rest of the video available to stream.

Program 150 transmits notifications to the user and recipient (step 210). In some embodiments, program 150 may transmit the notification to user computing device 104 and user computing device 110 using a plurality of transmission methods including, but not limited to, short message service (SMS), email, push notification, automated phone call, text-to-speech, etc. For example, a user receives a push notification on user computing device 104 after receiving a call in a low cellular strength travel segment. In this example, the recipient would also receive a notification concerning the poor network (cellular) strength. In another embodiment, program 150 may utilize text-to-speech methods to provide auditory notifications. In other embodiments, program 150 may utilize a plurality of factors when determining the method of transmission. These factors include, but are not limited to, available devices, capabilities of the available devices, method of transportation, weather conditions, traffic conditions, vehicle speed, etc. In an example, if the user is driving at high speeds, then program 150 delays the notification until program 150 determines that a notification would not unduly distract the user. In yet another example, if weather conditions are severe, then program 150 sends the notification via text-to-speech. In another embodiment, program 150 transmits the notification to a recipient (i.e., content provider, internet service provider, streaming service, etc.) which includes the scheduled time, the estimated amount of data, the estimated data transfer duration based on the estimated data amount and network speeds, and the estimated network signal strength. For example, if a user plans on streaming two videos during a scheduled trip, then program 150 transmits a notification to the streaming provider, optionally a notification may also be sent to the internet service provider), detailing the estimated data usage and the scheduled times.

In an embodiment, the notifications may include, but are not limited to, user identification, recipient identification, expected call duration, scheduled call time, expected cellular strength, call importance rating (derived from the calendar or inputted manually by the user), rationale for a cancelled or rescheduled call, etc. In another embodiment, the notifications may include further action options such as cancel current call, cancel scheduled call, initiate scheduled call, postpone scheduled call, replace scheduled call with another call, etc. In this embodiment, program 150 transmits notification to all affected recipients detailing the changes to the scheduled call, whether it be a cancellation, rescheduled call, etc. In various embodiments, program 150 initiates a scheduled call when the user commences a trip or enters a vehicle. For example, if the user always calls a specific person on the way to work, then program 150 initiates a telephone call to said person when the user is traveling to work. In various embodiments, the user authorizes program 150 to automatically initiate, cancel, reschedule calls, etc. In another embodiment, the user may authorize program 150 to control only a subset of functionality. For example, the user authorizes program 150 to cancel and reschedule calls but not to initiate a call without prior user authorization. In yet another embodiment, program 150 prompts the user to authorize the information utilized within the notification such as user identification, recipient identification, associated call information, etc.

In other embodiments, program 150 sends notifications when the user experiences travel changes such as delays, route changes, unexpected travel interruptions, or cessations. In a further embodiment, program 150 returns to scheduling a recipient (step 208) when the user experiences travel changes as previously described. In an example, an unexpected accident increases travel time by 10 minutes. In this example, program 150 un-schedules the determined recipient and recalculates the schedule based on the travel changes. In another embodiment, if an active call drops or disconnects due to cellular coverage or strength issues, program 150 transmits a notification detailing when both parties should reinitiate the call. In a further embodiment, program 150 automatically reinitiates the call when the user enters an area or segment that has sufficient cellular strength to withstand the remaining duration of the call. In yet another embodiment, program 150 automatically initiates the next scheduled call.

Program 150 determines whether there are any recipients remaining (step 212). In an embodiment, responsive to the user ending a data interaction and/or call with a recipient, program 150 removes said recipient from database 122 and checks if there are any recipients remaining. In another embodiment, program 150 prompts the user, via user interface 106, to add additional recipients. In yet another embodiment, program 150 prompts the user with the next scheduled recipient. If program 150 determines that there is a remaining recipient, then program 150 returns to determining scheduling a recipient (step 208).

Figure 3:
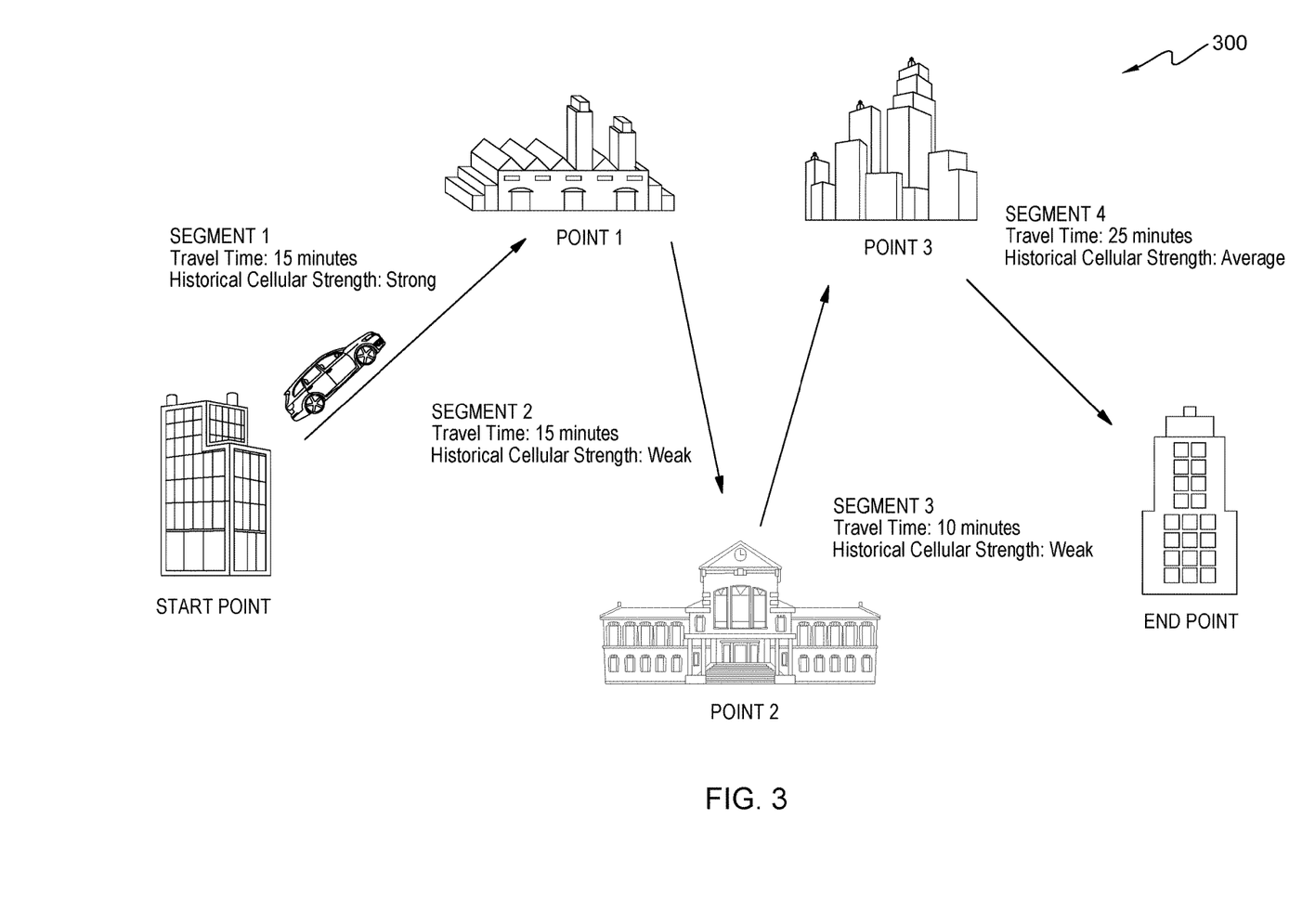
FIG. 3 depicts an example of a segmented route with associated travel times and network signal strength, in accordance with an embodiment of the present invention.

FIG. 3 depicts an example embodiment of the steps of flowchart 200 includes of a segmented route, which is an example illustration of a user travel route along with the associated travel times and network strength metadata.

In a detailed example of flowchart 200, Emilio is traveling from Start Point to End Point. After inputting the destination into a navigational application, program 150 receives a calculated route through Point 4 (not depicted). Emilio decides to ignore the navigational application and inputs a manual route into program 150, Start Point to Point 1 to Point 2 to Point 3 to End Point (the destination). Program 150 retrieves network profile information associated with Emilio's route from network profile history 126. Program 150 determines that the cellular coverage in the Segment 1 (Start Point to Point 1), with a predicted travel time of 15 minutes, has historically strong cellular strength. Program 150 also determines that the cellular coverage in Segment 2 (Point 1 to Point 2), with a predicted travel time of 15 minutes, has historically weak cellular strength. In addition, program 150 determines that Segment 3 (Point 2 to Point 3), with a predicted of 10 minutes, has historically weak cellular strength due to high amounts of network requests and traffic congestion. Finally, program 150 determines that the Segment 4 (Point 3 to End Point), with a predicted travel time of 25 minutes, has historically average cellular levels.

Emilio scheduled a call with Randy during his trip to End Point. Program 150 retrieves Emilio's schedule and adds Randy to database 122 as a recipient. Program 150 utilizes data history 124 to retrieve and analyze the data history metadata (call information) from all the calls between Emilio and Randy. Program 150 calculates that the average call between Emilio and Randy lasts for 3 minutes with a standard deviation of 2 minutes (1-5 minutes). As Emilio commences his trip to End Point, program 150 transmits notifications to both Emilio's and Randy's respective devices (e.g., user computing device 104 and user computing device 110) prompting both to initiate the call.

Halfway through the call, Christina and Rafael both initiate a call to Emilio. Program 150 detects the received calls and proceeds to add Christina and Rafael to database 122 as recipients, also retrieving the call history metadata of each recipient. Program 150 calculates that the average call from Emilio and Christina lasts 5 minutes with a standard deviation of 3 minutes (2-8 minutes) and the average call from Emilio and Rafael lasts 18 minutes with a standard deviation of 5 minutes (13-23 minutes). Program 150 transmits notifications to both Christina and Rafael. Program 150 transmits initial notification to Christina, advising that Emilio will be available for a call after 3 minutes and that the cellular strength will be sufficient to ensure that the call would not drop for the estimated duration of the call (2-8 minutes). Program 150 transmits a notification to Rafael, advising that Emilio will be available for a call after 30 minutes due a travel segment of weak cellular strength on Emilio's route. Program 150 determines that after the call with Emilio and Christina, Emilio will be in Segment 3 which, historically, does not have sufficient cellular strength to maintain a connection through the estimated duration (13-23 minutes). Program 150 determines that the call with Rafael is optimally scheduled when Emilio reaches Segment 4. After 5 minutes, program 150 transmits another notification to Emilio and Christina to initiate the call.

The traffic in Segment 3 segment worsened, delaying Emilio by an extra 3 minutes (travel segment took 13 minutes instead of the 10-minute estimate). After 30 minutes, program 150 transmits a notification to Rafael suggesting a 2-3 minute delay in calling Emilio due to the increased travel time in the, historically, weak cellular strength segment of Segment 3. After another 2 minutes, program 150 transmits a reminder notification signifying that Emilio is capable of receiving a call with sufficient cellular strength. As the Emilio and Rafael conversation continues into the $18^{th}$ minute, program 150 transmits a notification to both parties warning that Emilio is approaching a segment of weak cellular strength and that the call is likely to drop in 4 minutes. Emilio and Rafael, aware of the impending drop, finish the conversation. Emilio arrives at End Point completing all calls with all scheduled recipients without any dropped calls.

FIG. 3 depicts an example of a segmented route, which is an example illustration of a user travel route along with the associated travel times and network signal strength information.

Figure 4:
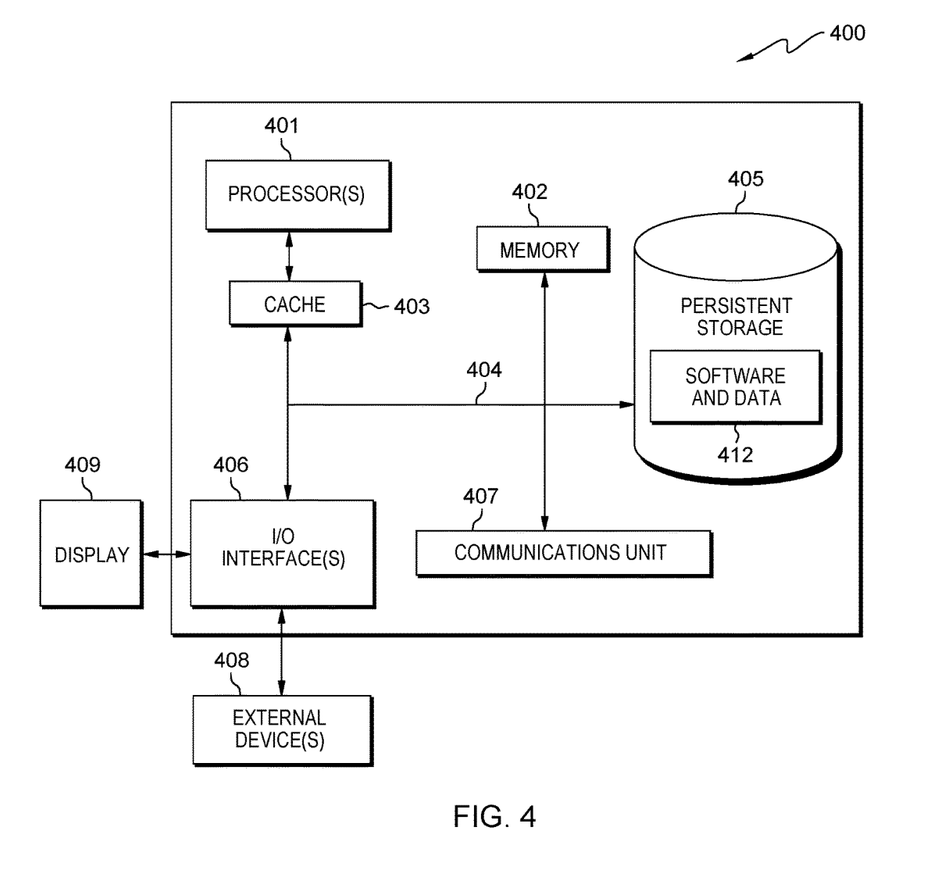
FIG. 4 is a block diagram of components of the server computer executing the program within the distributed processing environment of FIG. 1, in accordance with an embodiment of the present invention.

FIG. 4 depicts a block diagram of components of server computer 120 in accordance with an illustrative embodiment of the present invention. It should be appreciated that FIG. 4 provides only an illustration of one implementation and does not imply any limitations with regard to the environments in which different embodiments may be implemented. Many modifications to the depicted environment may be made.

Server computer 120 includes communications fabric 404, which provides communications between cache 403, memory 402, persistent storage 405, communications unit 407, and input/output (I/O) interface(s) 406. Communications fabric 404 can be implemented with any architecture designed for passing data and/or control information between processors (such as microprocessors, communications and network processors, etc.), system memory, peripheral devices, and any other hardware components within a system. For example, communications fabric 404 can be implemented with one or more buses or a crossbar switch.

Memory 402 and persistent storage 405 are computer readable storage media. In this embodiment, memory 402 includes random access memory (RAM). In general, memory 402 can include any suitable volatile or non-volatile computer readable storage media. Cache 403 is a fast memory that enhances the performance of computer processor(s) 401 by holding recently accessed data, and data near accessed data, from memory 402.

Program 150 may be stored in persistent storage 405 and in memory 402 for execution by one or more of the respective computer processor(s) 401 via cache 403. In an embodiment, persistent storage 405 includes a magnetic hard disk drive. Alternatively, or in addition to a magnetic hard disk drive, persistent storage 405 can include a solid-state hard drive, a semiconductor storage device, a read-only memory (ROM), an erasable programmable read-only memory (EPROM), a flash memory, or any other computer readable storage media that is capable of storing program instructions or digital information.

The media used by persistent storage 405 may also be removable. For example, a removable hard drive may be used for persistent storage 405. Other examples include optical and magnetic disks, thumb drives, and smart cards that are inserted into a drive for transfer onto another computer readable storage medium that is also part of persistent storage 405.

Communications unit 407, in these examples, provides for communications with other data processing systems or devices. In these examples, communications unit 407 includes one or more network interface cards. Communications unit 407 may provide communications through the use of either or both physical and wireless communications links. Program 150 may be downloaded to persistent storage 405 through communications unit 407.

I/O interface(s) 406 allows for input and output of data with other devices that may be connected to server computer 120. For example, I/O interface(s) 406 may provide a connection to external device(s) 408, such as a keyboard, a keypad, a touch screen, and/or some other suitable input device. External devices 408 can also include portable computer readable storage media such as, for example, thumb drives, portable optical or magnetic disks, and memory cards. Software and data 412 is used to practice embodiments of the present invention, e.g., program 150, can be stored on such portable computer readable storage media and can be loaded onto persistent storage 405 via I/O interface(s) 406. I/O interface(s) 406 also connect to a display 409.

Display 409 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a wave-guide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A method comprising:
   retrieving, by one or more computer processors, one or more historical telephone calls and associated historical recipients;
   predicting, by one or more computer processors, one or more future telephone calls and one or more possible recipients utilizing the retrieved one or more historical telephones calls and associated historical recipients;
   assigning, by one or more computer processors, one or more priority scores to the one or more predicted future telephone calls, wherein the priority score represents a probability of a predicted future telephone call and associated possible recipient;
   maintaining, by one or more computer processors, a dynamic list that includes one or more predicted future telephone calls associated with one or more possible recipients and one or more assigned priority scores;
   ranking, by one or more computer processors, one or more predicted future telephone calls within the maintained dynamic list based on one or more assigned priority scores;
   identifying, by one or more computer processors, an intended travel path of a user over a time interval;
   predicting, by one or more computer processors, a cellular signal strength of a user device for the intended travel path over the time interval; and
   scheduling, by one or more computer processors, the one or more future telephone calls during the time interval based on the predicted cellular signal strength and the maintained dynamic list.

2. The method of claim 1, wherein recipients predicting one or more future telephone calls and one or more possible recipients utilizing the retrieved one or more historical telephones calls and associated historical recipients, further comprises:
   calculating, by one or more computer processors, an average telephone call duration based on the retrieved historical calls;
   calculating, by one or more computer processors, a variance of telephone call duration based on the calculated average telephone call duration; and
   determining, by one or more computer processors, one or more possible recipients based on the historical telephone calls, average telephone call duration, and telephone call variance.

3. The method of claim 1, wherein identifying an intended travel path of a user over a time interval, further comprises:
   retrieving, by one or more computer processors, one or more historical visited locations;
   retrieving, by one or more computer processors, one or more scheduled events;
   predicting, by one or more computer processors, a user travel location and travel path; and
   calculating, by one or more computer processors, a travel time interval for the predicted travel path.

4. The method of claim 3, wherein calculating a travel time interval for the predicted travel path is based on at least one of the following: predicted weather, user speed, historical travel times, and predicted traffic density.

5. The method of claim 1, wherein predicting a cellular signal strength of a user device for the intended travel path over the time interval further comprises:
   segmenting, by one or more computer processors, the intended travel path;
   retrieving, by one or more computer processors, one or more instances of network profile history based on the segmented travel path; and
   associating, by one or more computer processors, one or more cellular signal strengths with the segmented travel path.

6. The method of claim 1, further comprises:
   modifying, by one or more computer processors, the travel path based on the predicted cellular signal strength of the intended travel path, the scheduled one or more future telephone calls, and the one or more possible recipients.

7. The method of claim 1, further comprises:
   transmitting, by one or more computer processors, one or more notifications to the user and to the one or more recipients.

8. The method of claim 7, wherein the one or more notifications includes information selected from the group consisting of: user identification, recipient identification, estimated data usage, estimated data duration, user travel path, and estimated cellular strength.

9. A method comprising:
   retrieving, by one or more computer processors, one or more historical data transfers;
   predicting, by one or more computer processors, one or more future data transfers utilizing the retrieved one or more historical data transfers;
   assigning, by one or more computer processors, one or more priority scores to the one or more predicted future data transfers, wherein the priority score represents a probability of a predicted data transfers;
   maintaining, by one or more computer processors, a dynamic list that includes one or more predicted future data transfers and one or more assigned priority scores;
   ranking, by one or more computer processors, one or more predicted data transfers within the maintained dynamic list based on one or more assigned priority scores;
   identifying, by one or more computer processors, an intended travel path of a user over a time interval;
   predicting, by one or more computer processors, a network signal strength of a user device for the intended travel path over the time interval; and scheduling, by one or more computer processors, the one or more future data transfers during the time interval based on the predicted cellular network signal strength and the maintained dynamic list.

10. The method of claim 9, wherein scheduling, by one or more computer processors, the one or more future data transfers during the time interval based on the predicted cellular signal strength and the maintained dynamic list, further comprises:
    identifying, by one or more computer processors, one or more segments of the travel path of the user that do not have sufficient network signal strength to complete one or more future data transfers; and
    scheduling, by one or more computer processors, one or more future data transfers during segments of the travel path of the user that have sufficient network signal strength to complete the one or more future data transfers.

11. The method of claim 10, further comprises:
    identifying, by one or more computer processors, one or more data transfers that are streaming videos; and
    downloading, by one or more computer processors, one or more portions of the streaming video that do not have sufficient network signal strength to complete streaming.

12. The method of claim 9, wherein predicting one or more future data transfers and one or more possible recipients utilizing the retrieved one or more historical data transfers, further comprises:
    calculating, by one or more computer processors, an average data transfer speed and associated variance for the one or more historical data transfers; and
    calculating, by one or more computer processors, an average data transfer amount and associated variance for the one or more historical data transfers.

13. The method of claim 9, wherein predicting a network signal strength of a user device for the intended travel path over the time interval further comprises:
    segmenting, by one or more computer processors, the intended travel path;
    retrieving, by one or more computer processors, one or more instances of network profile history based on the segmented travel path; and
    associating, by one or more computer processors, one or more network signal strengths with the segmented travel path.

14. The method of claim 9, further comprises:
    transmitting, by one or more computer processors, one or more notifications to a network service provider.

15. The method of claim 14, wherein the one or more notifications includes information selected from the group consisting of: user identification, network service provider identification, estimated data usage, estimated data duration, user travel path, and predicted network signal strength along user travel path.

16. The method of claim 9, further comprises:
    modifying, by one or more computer processors, the travel path of the user based on the predicted network signal strength of the intended travel path and the scheduled one or more future data transfers.

17. A computer system comprising:
    one or more computer processors;
    one or more computer readable storage media; and
    program instructions stored on the computer readable media for execution by at least one of the one or more processors, the program instructions comprising:
        program instructions to retrieve one or more historical data transfers;
        program instructions to predict one or more future data transfers and one or more possible recipients utilizing the retrieved one or more historical data transfers;
        program instructions to assign one or more priority scores to the one or more predicted future data transfers, wherein the priority score represents a probability of a predicted data transfers;
        program instructions to maintain a dynamic list that includes one or more predicted future data transfers associated with one or more assigned priority scores;
        program instructions to rank one or more predicted data transfers within the maintained dynamic list based on one or more assigned priority scores;
        program instructions to identify an intended travel path of a user over a time interval;
        program instructions to predict a network signal strength of a user device for the intended travel path over the time interval; and
        program instructions to schedule the one or more future data transfers during the time interval based on the predicted cellular network signal strength and the maintained dynamic list.

18. The computer system of claim 17, wherein scheduling the one or more future data transfers during the time interval based on the predicted cellular signal strength and the maintained dynamic list, further comprises program instructions to:
    identify one or more segments of the travel path of the user that do not have sufficient network signal strength to complete one or more future data transfers; and
    schedule one or more future data transfers during segments of the travel path of the user that have sufficient network signal strength to complete the one or more future data transfers.

19. The computer system of claim 17, further comprises, program instructions to transmit one or more notifications to a network service provider.

20. The computer system of claim 17, further comprises, program instructions to modify the travel path of the user based on the predicted network signal strength of the intended travel path and the scheduled one or more future data transfers.

* * * * *